United States Patent
Sakuma et al.

(10) Patent No.: US 8,249,252 B2
(45) Date of Patent: Aug. 21, 2012

(54) INFORMATION PROCESSING APPARATUS, INFORMATION PROCESSING METHOD, AND PROGRAM

(75) Inventors: Takashi Sakuma, Kanagawa (JP); Iori Matsuto, Kanagawa (JP); Hiroyuki Yoshida, Tokyo (JP); Hirooki Tajima, Tokyo (JP); Masanori Nomura, Tokyo (JP); Hiroshi Nagatani, Tokyo (JP); YuHang Shen, Tokyo (JP)

(73) Assignee: Sony Corporation, Tokyo (JP)

( * ) Notice: Subject to any disclaimer, the term of this patent is extended or adjusted under 35 U.S.C. 154(b) by 1525 days.

(21) Appl. No.: 11/224,978

(22) Filed: Sep. 14, 2005

(65) Prior Publication Data

US 2006/0072751 A1 Apr. 6, 2006

(30) Foreign Application Priority Data

Oct. 1, 2004 (JP) ................................. 2004-289988

(51) Int. Cl.
*G06F 21/00* (2006.01)
(52) U.S. Cl. ........................................ 380/203; 380/217
(58) Field of Classification Search .................. 380/201, 380/203, 204, 210, 212, 216, 217, 221, 200, 380/236, 237, 220; 715/716, 718, 719
See application file for complete search history.

(56) References Cited

U.S. PATENT DOCUMENTS

| 4,989,091 A * | 1/1991 | Lucas ........................... 348/458 |
| 2004/0031048 A1* | 2/2004 | Horlander ........................ 725/25 |
| 2004/0114759 A1* | 6/2004 | Yoshimura et al. ........... 380/251 |
| 2005/0024532 A1* | 2/2005 | Choi ............................. 348/441 |
| 2005/0160364 A1* | 7/2005 | Taniguchi et al. ............ 715/718 |

FOREIGN PATENT DOCUMENTS

| JP | 2002-77834 | 3/2002 |
| JP | 2002-204406 | 7/2002 |
| JP | 2002-262252 | 9/2002 |
| JP | 2003-224816 | 8/2003 |
| WO | WO 2004/046936 A1 | 6/2004 |

* cited by examiner

*Primary Examiner* — Gilberto Barron, Jr.
*Assistant Examiner* — Izunna Okeke
(74) *Attorney, Agent, or Firm* — Oblon, Spivak, McClelland, Maier & Neustadt, L.L.P.

(57) ABSTRACT

An information processing apparatus for outputting a predetermined video signal from a component output terminal includes signal detection means for detecting a copy protection signal embedded in the video signal to protect copyright, setting detection means for detecting a currently set output format of the video signal output from the component output terminal when the copy protection signal is detected by the signal detection means, and changing means for changing the output format detected by the setting detection means to an alternative output format when the output format is a predetermined format.

7 Claims, 12 Drawing Sheets

FIG. 2

| SIGNAL FORMAT | NUMBER OF SCANNING LINES | NUMBER OF EFFECTIVE SCANNING LINES | SCANNING METHOD | 525i | 525p | 1125i | 750p | D TERMINAL |
|---|---|---|---|---|---|---|---|---|
| 525i | 525 | 480 | INTERLACE (INTERLACED SCANNING) | ○ | × | × | × | D1 |
| 525p | 525 | 480 | PROGRESSIVE (SEQUENTIAL SCANNING) | ○ | ○ | × | × | D2 |
| 1125i | 1125 | 1080 | INTERLACE (INTERLACED SCANNING) | ○ | ○ | ○ | × | D3 |
| 750p | 750 | 720 | PROGRESSIVE (SEQUENTIAL SCANNING) | ○ | ○ | ○ | ○ | D4 |

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2004-289988 filed in the Japanese Patent Office on Oct. 1, 2004, the entire contents of which are incorporated herein by reference.

BACKGROUND OF THE INVENTION

1. Field of the Invention

The present invention generally relates to an information processing apparatus, an information processing method, and a program and, in particular, to an information processing apparatus, an information processing method, and a program capable of controlling an output format in accordance with the type of a video signal output from a component output terminal.

2. Description of the Related Art

In recent years, television broadcasts have been digitized and the resolution of the broadcasts has been increased. Accordingly, the use of television receivers (hereinafter simply referred to as "TVs") that receive and output a signal in a high-definition format, such as 1125i and 750p, has become widespread (refer to, for example, Japanese Unexamined Patent Application Publication No. 2003-338993).

In the output format of 1125i, the number of scanning lines (resolution), the number of effective scanning lines, and a scanning method of an output video signal are 1125, 1080, and an interlace method, respectively. In the output format of 750p, the number of effective scanning lines, and a scanning method of an output video signal are 750, 720, and a progressive method, respectively.

In addition, some recent computers (personal computers) incorporate a television tuner. Users can use the computer as a TV. The users can also use the computer as a recording and playback apparatus by recording TV programs received by the television tuner in a hard disk or a digital versatile disc (DVD).

Furthermore, the users can connect the computer to a digital still camera or a digital video camera (hereinafter collectively referred to as a "digital camera") to edit an image captured by the digital camera and record it. The number of pixels in the image captured by a charged coupled device (CCD) or a complementary metal oxide semiconductor (CMOS) of a digital camera has increased as the technology has advanced. That is, the resolution of the image (video signal) captured by digital cameras has also increased.

Accordingly, it is desirable that a video signal output terminal of the computer can output a video signal input or recorded in a high-resolution format without degrading the resolution. That is, it is desirable that the video signal output terminal of the computer can output a signal of a high-definition format.

If a component output terminal capable of outputting a signal of a high-definition format is provided to the computer, the computer can output a video signal of content of the high-definition format recorded on a hard disk or a DVD without degrading the high-definition format.

SUMMARY OF THE INVENTION

However, if the video signal output from the component output terminal is a signal that, for example, is to be played back by a DVD drive and that requires copyright protection, such as a movie, that is, if the video signal output from the component output terminal contains a signal that prevents any unauthorized copying of the content, the video signal of the content cannot be output in the high-definition format due to the limitation of the standard.

Therefore, when the component output terminal capable of outputting a signal of a high-definition format is provided to the computer, it is desirable that the computer controls the output format in accordance with the type of video signal output from the component output terminal.

Accordingly, there is provided an information processing apparatus, an information processing method, and a program that can control the output format in accordance with the type of video signal output from the component output terminal.

According to an embodiment of the present invention, an information processing apparatus for outputting a predetermined video signal from a component output terminal includes signal detection means for detecting a copy protection signal embedded in the video signal to protect copyright, setting detection means for detecting a currently set output format of the video signal output from the component output terminal when the copy protection signal is detected by the signal detection means, and changing means for changing the output format detected by the setting detection means to an alternative output format when the output format is a predetermined format.

The information processing apparatus can further include setting means for setting the alternative output format and storage means for storing the alternative output format set by the setting means. The changing means changes the output format detected by the setting detection means to the alternative output format stored in the storage means when the output format is the predetermined format.

The information processing apparatus can further include storage means for storing the output format detected by the setting detection means. When the output format detected by the setting detection means is the predetermined format, the changing means stores the output format in the storage means and changes the output format to the alternative output format.

According to an embodiment of the present invention, an information processing method of outputting a predetermined video signal from a component output terminal includes the steps of detecting a copy protection signal embedded in the video signal to protect copyright, detecting a currently set output format of the video signal output from the component output terminal when the copy protection signal is detected, and, when the output format detected in the step of detecting the currently set output format is a predetermined format, changing the output format to an alternative output format.

According to an embodiment of the present invention, a program for causing a computer to output a predetermined video signal from a component output terminal includes the steps of detecting a copy protection signal embedded in the video signal to protect copyright, detecting a currently set output format of the video signal output from the component output terminal when the copy protection signal is detected, setting an alternative output format used when the output format detected in the step of detecting a currently set output format of the video signal is a predetermined output format, storing the alternative output format set in the step of setting an alternative output format in first storage means, and, when the output format detected in the step of detecting a currently set output format of the video signal is the predetermined format, changing the output format detected in the step of detecting a currently set output format of the video signal to the alternative output format stored in the first storage means after storing the output format in second storage means.

In the information processing apparatus, the information processing method, and the program, when a copy protection signal embedded in the video signal to protect copyright is detected, a currently set output format of the video signal output from the component output terminal is detected. If the detected output format is a predetermined output format, the output format is changed to an alternative output format.

According to an embodiment of the present invention, an information processing apparatus for outputting a predetermined video signal from a component output terminal includes signal detection means for detecting whether the video signal is encrypted, setting detection means for detecting a currently set output format of the video signal output from the component output terminal when the video signal is encrypted, and changing means for changing the output format detected by the setting detection means to an alternative output format when the output format detected by the setting detection means is a predetermined format.

The information processing apparatus can further include setting means for setting the alternative output format and storage means for storing the alternative output format set by the setting means. The changing means changes the output format detected by the setting detection means to the alternative output format stored in the storage means when the output format is the predetermined format.

The information processing apparatus can further include storage means for storing the output format detected by the setting detection means. When the output format detected by the setting detection means is the predetermined format, the changing means stores the output format in the storage means and changes the output format to the alternative output format.

According to an embodiment of the present invention, an information processing method of outputting a predetermined video signal from a component output terminal includes the steps of detecting whether the video signal is encrypted, detecting a currently set output format of the video signal output from the component output terminal when the video signal is encrypted, and changing the output format detected by the step of detecting a currently set output format of the video signal to an alternative output format when the output format detected by the step of detecting a currently set output format of the video signal is a predetermined format.

According to an embodiment of the present invention, a program for causing a computer to output a predetermined video signal from a component output terminal includes the steps of detecting whether the video signal is encrypted, detecting a currently set output format of the video signal output from the component output terminal when the video signal is encrypted, setting an alternative output format used when the output format detected in the step of detecting a currently set output format of the video signal is a predetermined output format, storing the alternative output format set in the step of setting an alternative output format in first storage means, and, when the output format detected in the step of detecting a currently set output format of the video signal is a predetermined format, changing the output format detected in the step of detecting a currently set output format of the video signal to the alternative output format stored in the first storage means after storing the output format in second storage means.

In the information processing apparatus, the information processing method, and the program, when a video signal is encrypted, a currently set output format of the video signal output from a component output terminal is detected. If the detected output format is a predetermined format, the output format is changed to an alternative output format.

According to the embodiments of the present invention, an information processing apparatus, an information processing method, and a program can control the output format of a video signal output from a component output terminal in accordance with the type of output video signal.

BRIEF DESCRIPTION OF THE DRAWINGS

FIG. 2 illustrates a signal format of a video signal;

DESCRIPTION OF THE PREFERRED EMBODIMENTS

Figure 1:
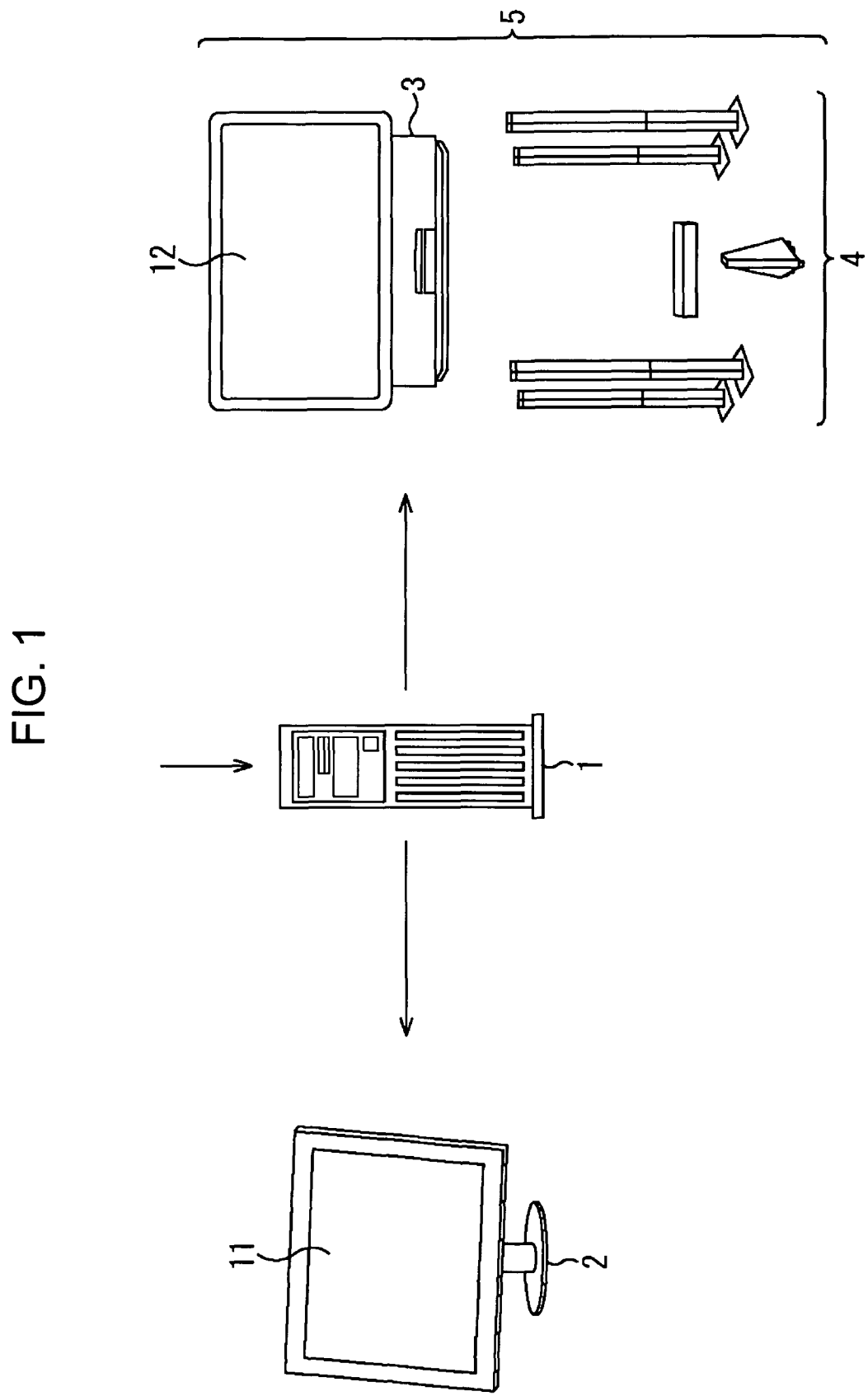
FIG. 1 illustrates an example of the configuration of a computer system according to an embodiment of the present invention.

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiment(s) are described in the claims. That is, the description does not deny the existence of aspects of the present invention that are described in the embodiment(s) but not claimed in the invention of this application, i.e., the existence of aspects of the present invention that in future may be claimed by a divisional application, or that may be additionally claimed through amendments.

According to an embodiment of the present invention, an information processing apparatus (e.g., a computer 1 shown in FIG. 1) for outputting a predetermined video signal from a component output terminal includes signal detection means (e.g., a signal processing unit 102 shown in FIG. 4) for detecting a copy protection signal embedded in the video signal to protect copyright, setting detection means (e.g., an output setting unit 103 shown in FIG. 4) for detecting a currently set output format of the video signal output from the component output terminal when the copy protection signal is detected by the signal detection means, and changing means (e.g., an output control unit 104 shown in FIG. 4) for changing the output format detected by the setting detection means to an alternative output format when the output format is a predetermined format.

The information processing apparatus can further include setting means (e.g., a setting window 161 shown in FIG. 9) for setting the alternative output format and storage means (e.g., a storage unit 106 shown in FIG. 4) for storing the alternative output format set by the setting means. The changing means changes the output format detected by the setting detection means to the alternative output format stored in the storage means when the output format is the predetermined format.

The information processing apparatus can further include storage means (e.g., a memory 105 shown in FIG. 4) for storing the output format detected by the setting detection means. When the output format detected by the setting detection means is the predetermined format, the changing means stores the output format in the storage means and changes the output format to the alternative output format.

Figure 12:
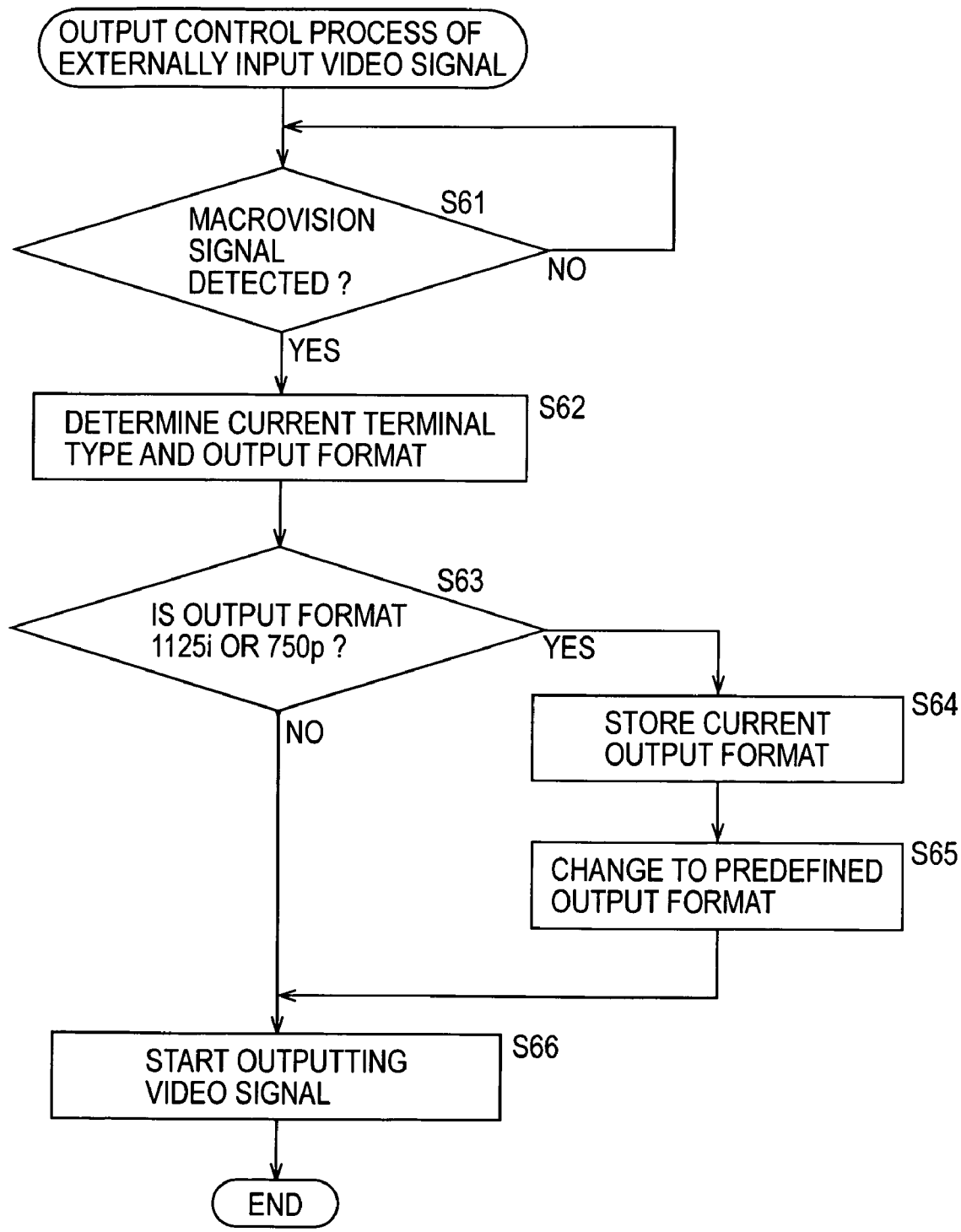
FIG. 12 is a flow chart illustrating another output control process.

According to an embodiment of the present invention, an information processing method of outputting a predetermined video signal from a component output terminal includes the steps of detecting a copy protection signal embedded in the video signal to protect copyright (e.g., step S61 shown in FIG. 12), detecting a currently set output format of the video signal output from the component output terminal when the copy protection signal is detected (e.g., step S62 shown in FIG. 12), and, when the output format detected in the step of detecting the currently set output format is a predetermined format, changing the output format to an alternative output format (e.g., step S65 shown in FIG. 12).

Embodiments of the present invention are described below with reference to the accompanying drawings.

FIG. 1 illustrates an example of the configuration of a computer system according to an embodiment of the present invention.

As shown in FIG. 1, the computer system includes a computer 1, a video graphics array (VGA) monitor 2, and a TV set 5 including a TV monitor 3 and a surround sound system 4.

The computer 1 outputs an image (a video signal) and sound (an audio signal) of the content of a TV program received from a broadcast signal or a movie played back from a DVD to the VGA monitor 2 or the TV monitor 3 via a predetermined output terminal. Additionally, the computer 1 inputs an image (a video signal) and sound (an audio signal) from a recording and playback apparatus (e.g., a hard disk recorder, a video cassette recorder (VCR), and a DVD player) or from a digital camera (digital still camera or digital video camera) via a predetermined input terminal.

An operating system (OS), such as WINDOWS, is installed on the computer 1. Predetermined application programs running under the OS, such as spreadsheet software and word processing software, are also installed on the computer 1. In addition, the computer 1 can be connected to a network (e.g., the Internet) to access a desired Web server. "WINDOWS" is a trademark of Microsoft Corporation.

The VGA monitor 2 includes a screen 11 composed of, for example, a liquid crystal display (LCD). The VGA monitor 2 is connected to the output terminal of the computer 1 via an analog RGB cable or a digital visual interface (DVI). Thus, the VGA monitor 2 displays a predetermined image on the screen 11 in accordance with a video signal supplied from the computer 1. For example, the VGA monitor 2 displays images, such as windows generated by WINDOWS™, spreadsheet software, word processing software, or e-mail software on the screen (display area) 11. The VGA monitor 2 can change the resolution of the screen 11 from 640×480 (VGA) to 1024×768 (super video graphics array: SVGA) or to 1280×1024 (super extended graphics array: SXGA).

On the other hand, the TV monitor 3 is a TV receiver that can receive and display a broadcast signal of a signal format 525i, 525p, 1125i, or 750p, which are described below. The screen (display area) 12 of the TV monitor 3 is composed of, for example, an LCD or a plasma display panel. The screen 12 is larger than the screen 11 of the VGA monitor 2.

The TV monitor 3 includes an external input terminal capable of inputting a component video signal of a signal format 525i, 525p, 1125i, or 750p. A video signal from an output terminal (video output terminal) of the computer 1 is input to the external input terminal.

The TV monitor 3 also includes an external input terminal capable of inputting an audio signal of six channels (5.1 channels). An audio signal from an output terminal (audio output terminal) of the computer 1 is input to the external input terminal. The audio signal input to the TV monitor 3 is converted to sound so as to be output from the surround sound system 4 connected to the TV monitor 3. The sound is output from six channels (5.1 channels), namely, the right, left, front (central), left rear, right rear, and sub-woofer channels.

In the computer system having such a configuration, a user uses the VGA monitor 2 as a main monitor and uses the TV monitor 3 as a sub monitor. That is, an image or sound from the computer 1 is normally output to the VGA monitor 2. The user carries out a working operation, such as a word processing operation, a mail writing operation, and a Web browsing operation while viewing video (an image) displayed on the screen 11 of the VGA monitor 2. When the user desires to enjoy content of a TV program or a DVD displayed on a large screen or a screen independent from the VGA monitor 2, the user operates the computer 1 to start a TV monitor application. The TV monitor application outputs the video content specified by the user onto the TV monitor 3 and outputs the sound to the surround sound system 4.

The signal format of a video signal that the TV monitor 3 can receive is described with reference to FIG. 2. As described above, the TV monitor 3 can receive a video signal (broadcast signal) of signal formats 525i, 525p, 1125i, or 750p.

As shown in FIG. 2, the signal format 525i defines a video signal having the number of scanning lines (resolution) of 525, the number of effective scanning lines of 480, and a scanning method of interlace (interlaced scanning).

The signal format 525p defines a video signal having the number of scanning lines of 525, the number of effective scanning lines of 480, and a scanning method of progressive (sequential scanning).

Similarly, the signal format 1125i defines a video signal having the number of scanning lines of 1125, the number of effective scanning lines of 1080, and a scanning method of interlace (interlaced scanning).

The signal format 750p defines a video signal having the number of scanning lines of 750, the number of effective scanning lines of 720, and a scanning method of progressive (sequential scanning).

A terminal that can input only a 525i component video signal is known as a D1 terminal of CP-4120 standard defined by the Electronic Industries Association of Japan (EIAJ).

A terminal that can input a 525p component video signal can also input a 525i component video signal. This terminal is known as a D2 terminal of CP-4120 standard defined by the EIAJ.

A terminal that can input an 1125i component video signal can also input the 525i and 525p component video signals. This terminal is known as a D3 terminal of CP-4120 standard defined by the EIAJ.

A terminal that can input a 750p component video signal can also input the 525i, 525p, and 1125i component video signals. This terminal is known as a D4 terminal of CP-4120 standard defined by the EIAJ.

Figure 3:
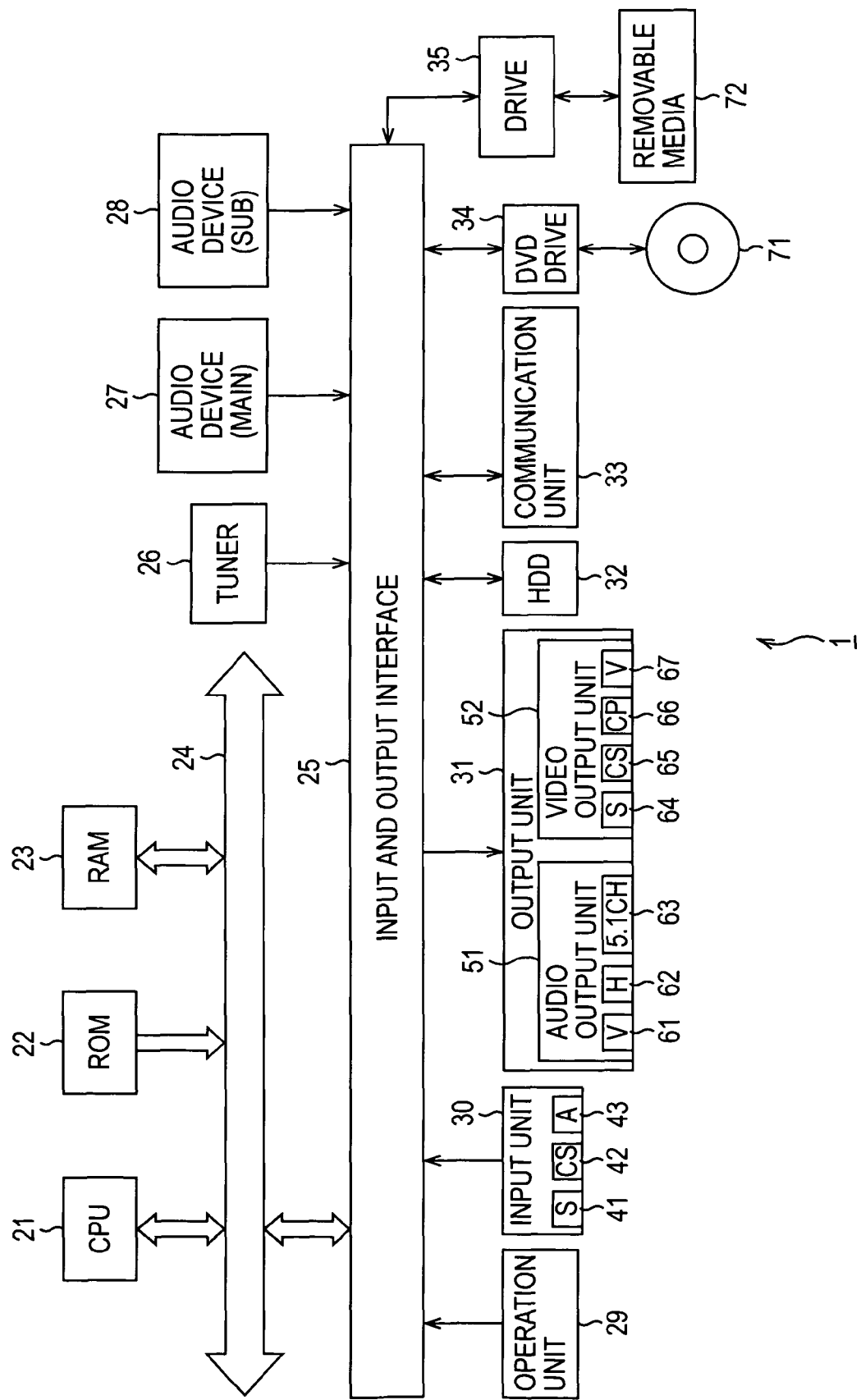
FIG. 3 is a block diagram of the configuration of a computer 1 shown in FIG. 1.

FIG. 3 is a block diagram of the configuration of the computer 1 shown in FIG. 1.

As shown in FIG. 3, a central processing unit (CPU) 21 carries out a variety of processing in accordance with a program stored in a read only memory (ROM) 22 or in accordance with a program loaded from a hard disk drive (HDD) 32 to a random access memory (RAM) 23. The RAM 23 also stores data necessary for the CPU 21 to carry out the variety of processing as needed.

Examples of the programs (applications) loaded from the HDD 32 to the RAM 23 and executed by the CPU 21 include a sound output control program for controlling the sound output from the computer 1 and a video output control program for controlling the video output from the computer 1, as well as the above-described OS and spreadsheet software.

The CPU 21, the ROM 22, and the RAM 23 are connected to each other via a bus 24. An input and output interface 25 is also connected to the bus 24.

Also connected to the input and output interface 25 are a tuner 26 for receiving a broadcast signal delivered from an antenna (not shown) to detect and demodulate a broadcast signal of a predetermined channel, a main audio device 27 and a sub audio device 28 for generating an audio signal (sound), an operation unit 29 including a keyboard and a mouse, an input unit 30 for inputting an external video (image) signal or an audio (sound) signal, an output unit 31 for outputting a video (image) signal or an audio (sound) signal to an external device, the HDD 32 for storing (recording) predetermined data, a communication unit 33 including a modem or a terminal adaptor, and a DVD drive 34 for recording or playing back data to or from a DVD 71.

A drive 35 is also connected to the input and output interface 25 as needed. Removable media (recording media) 72 are appropriately mounted to the drive 35. Examples of the removable media include a magnetic disk including a flexible disk, an optical disk (e.g., compact disk-read only memory (CD-ROM) and a magneto optical disk (mini-disk: MD)), and a semiconductor memory. A computer program read out of these media is installed in the HDD 32 as needed.

The input unit 30 includes at least an S (S-video) input terminal 41 for inputting a video signal in which a luminance signal is separated from a color signal, a composite input terminal 42 for inputting a composite video signal, and an audio input terminal 43 for inputting an audio signal.

The output unit 31 includes an audio output unit (audio output terminal) 51 and a video output unit (video output terminal) 52.

The audio output unit 51 includes at least a VGA monitor (V) output terminal 61 for outputting an audio signal (sound) to a speaker incorporated in the VGA monitor 2, a head phone (H) output terminal 62 for outputting an audio signal (sound) to a head phone, and a surround (5.1 CH) output terminal 63 for outputting an audio signal as surround sound. The volume of audio signals output from the VGA monitor output terminal 61 and the head phone output terminal 62 can be changed when outputting the audio signals. However, since the surround output terminal 63 is an RCA terminal, the volume of the audio signal from the surround output terminal 63 cannot be changed. That is, the output volume level is constant.

In the computer system shown in FIG. 1, the VGA monitor output terminal 61 is connected to the VGA monitor 2 via a predetermined cable, whereas the surround output terminal 63 is connected to the TV monitor 3 via a predetermined cable.

The video output unit 52 includes at least an S (S-video) output terminal 64 for outputting a video signal in which a luminance signal is separated from a color signal, a composite (CS) output terminal 65 for outputting a composite video signal, a component (CP) output terminal 66 for outputting a component video signal, and a VGA monitor (V) output terminal 67 for outputting a video signal to the VGA monitor 2 using analog RGB or a DVI.

In the computer system shown in FIG. 1, the VGA monitor output terminal 67 is connected to the VGA monitor 2 via a predetermined cable, whereas the component output terminal 66 is connected to the TV monitor 3 via a predetermined cable.

A hard disk incorporated in the HDD 32 stores (records) the above-described OS and spreadsheet software, and a variety of application programs including the sound output control program and a video output control program. The program stored in the HDD 32 is loaded into the RAM 23 under the control of the CPU 21 in response to an operation signal from the operation unit 29 operated by a user.

Additionally, the HDD 32 can record an image and sound input from the input unit 30 (e.g., an image captured by a digital camera) and an image and sound of a TV program received by the tuner 26. Thus, for example, the user can play back the previously recorded TV program or can edit an image captured by a digital camera and store the edited image in the HDD 32 again. The images of the TV program and the digital camera may be either a standard definition (SD) image or a high definition (HD) image.

Using the computer 1 having such a configuration, for example, a user can output (display) video (including sound) of a TV program received by the tuner 26, video of a movie played back by the DVD drive 34, or video (including a still image and sound) from the output unit 31 to the VGA monitor 2 or the TV monitor 3 to enjoy it or can store it in the HDD 32. Additionally, the computer 1 can include a plurality of the tuners 26 and simultaneously record a plurality of TV programs broadcasted via a plurality of channels.

As described above, the TV monitor 3 connected to the computer 1 can receive or display a video signal of either one of the 525i, 525p, 1125i, and 750p formats. Accordingly, when the computer 1 outputs a TV program of a video signal of the 1125i or 750p format received by the tuner 26 or video of a video signal of the 1125i or 750p format captured by a digital camera to the TV monitor 3, it is desirable that the computer 1 directly outputs the video signal of the 1125i or 750p format (i.e., high-definition format).

However, if the video output from the computer 1 to the TV monitor 3 is, for example, the content of a movie that is played back by the DVD drive 34 and that includes the Macrovision signal to protect copyright, the computer 1 cannot output the video signal of the video. This is because a Macrovision signal that protects copyright is defined on the basis of the 525i or 525p signal format, that is, the Macrovision signal does not support the 1125i and 750p signal formats.

Accordingly, if the Macrovision signal is embedded in the video signal output from the component output terminal 66, it is desirable that the computer 1 converts the video signal to the 525i or 525p signal format to output it. Additionally, if the video signal output from the component output terminal 66 is encrypted with the control scrambling system (CSS), it is desirable that the computer 1 converts the video signal to the 525i or 525p signal format to output it for the same reason.

Figure 4:
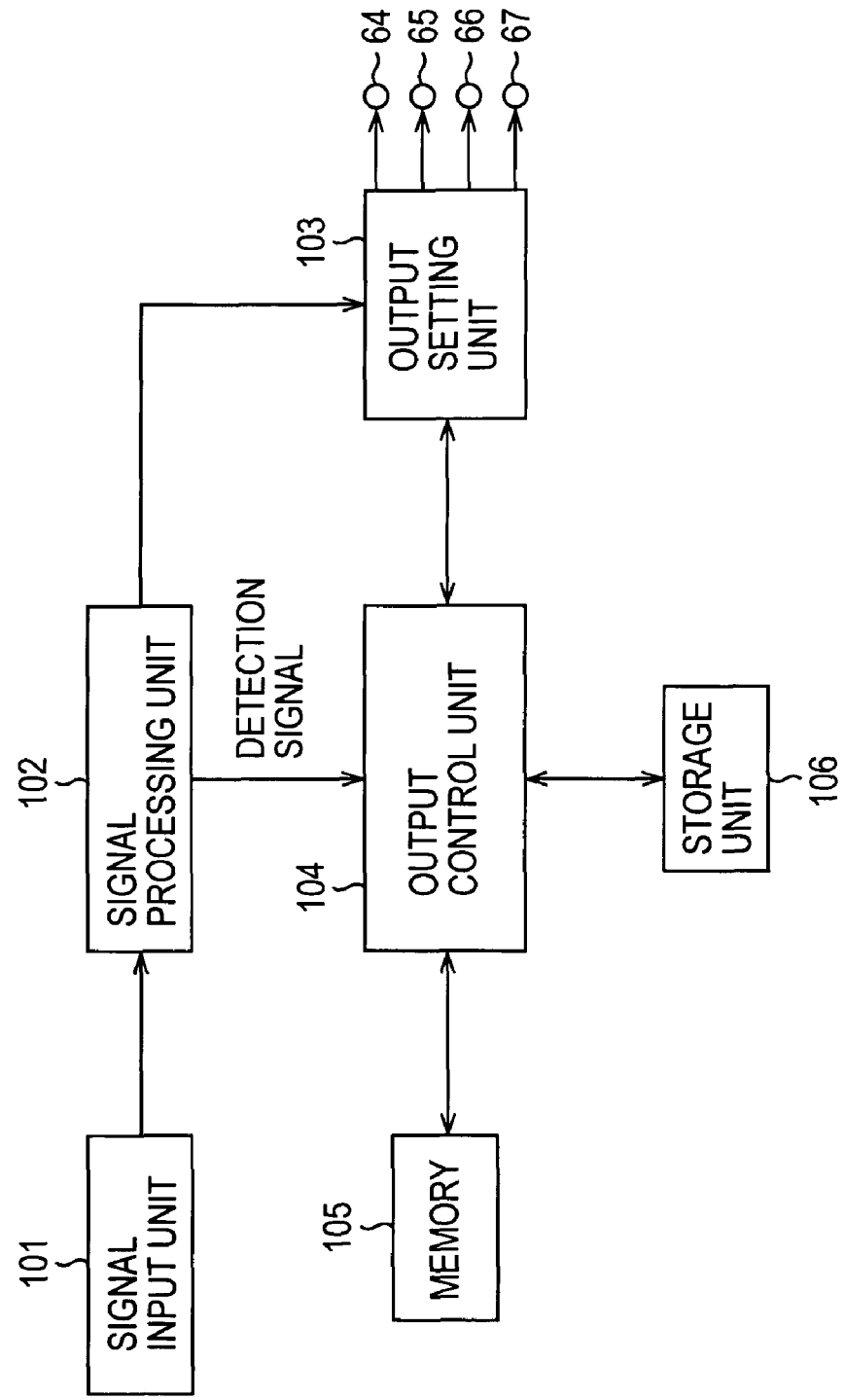
FIG. 4 illustrates a functional block of the control of the signal format by the computer 1.

FIG. 4 illustrates a functional block of the control of the signal format of a video signal output from the component output terminal 66 of the video output unit 52 in the computer 1. Hereinafter, the signal format is referred to as an "output format".

A signal input unit 101 inputs (delivers) a video signal to a signal processing unit 102. The video signal is a video signal input from the input unit 30 shown in FIG. 3 or a video signal played back by the DVD drive 34 shown in FIG. 3.

The signal processing unit 102 carries out an analog to digital (A/D) conversion process and a decompression process of a predetermined format, such as an MPEG (moving picture expert group) decompression process, as needed. The signal processing unit 102 then delivers the resultant video signal to an output setting unit 103. While the signal processing unit 102 delivers the video signal to the output setting unit 103, the signal processing unit 102 also delivers a playback processing signal to an output control unit 104.

Additionally, the signal processing unit 102 detects whether a video signal delivered from the signal input unit 101 is encrypted with CSS. Furthermore, the signal processing unit 102 detects whether the Macrovision signal is embedded in a video signal delivered from the signal input unit 101. As used herein, the Macrovision signal is a signal for protecting copyright (a copy protection signal).

Hereinafter, the case where it is detected that a video signal delivered from the signal input unit 101 is encrypted with CSS is referred to as the case where CSS encryption is detected. Similarly, the case where it is detected that the Macrovision signal is embedded in a video signal delivered from the signal input unit 101 is referred to as the case where the Macrovision signal is detected.

If CSS encryption is detected or the Macrovision signal is detected, the signal processing unit 102 delivers a detection signal to the output control unit 104 as well as the playback processing signal.

In FIG. 4, the detection signal is delivered from the signal processing unit 102 in the following two cases: (1) the CSS or Macrovision signal is detected from a video signal played back by the DVD drive 34; and (2) the Macrovision signal is detected from a video signal input from the input unit 30.

The signal processing unit 102 determines whether a video signal delivered from the signal input unit 101 is encrypted with CSS. If CSS encryption is not detected, the signal processing unit 102 then determines whether the Macrovision signal is embedded in the video signal delivered from the signal input unit 101. Accordingly, in some cases, a video signal played back by the DVD drive 34 is encrypted with CSS and also contains the Macrovision signal. In such a case, when, for example, the signal processing unit 102 detects CSS encryption, the signal processing unit 102 outputs a detection signal to the output control unit 104 without detecting the Macrovision signal embedded in the video signal. Thus, the signal processing unit 102 detects CSS encryption from a video signal played back by the DVD drive 34 and detects the Macrovision signal from a video signal input from the input unit 30. It will be appreciated that the signal processing unit 102 may detect both CSS signal and Macrovision signal from a video signal played back by the DVD drive 34.

The output setting unit 103 determines whether the VGA monitor 2 is connected to the VGA monitor output terminal 67. In addition, the output setting unit 103 determines whether the TV monitor 3 is connected to either one of the S-video output terminal 64, a composite output terminal 65, and a component output terminal 66. In this embodiment, as described above, the TV monitor 3 is connected to the component output terminal 66.

When the TV monitor 3 is connected to the component output terminal 66, the output setting unit 103 determines which one of the 525i, 525p, 1125i, and 750p formats is set to output a signal. The output format of the video signal supplied by the signal processing unit 102 is determined (set) by an output format setting signal delivered from the output control unit 104. The output setting unit 103 outputs a video signal supplied from the signal processing unit 102 to the TV monitor 3 in the output format determined by the output format setting signal.

The output control unit 104 determines whether a video signal is output from the output setting unit 103 to the TV monitor 3 by determining whether the playback processing signal is delivered from the signal processing unit 102.

Additionally, upon receiving the detection signal from the signal processing unit 102, the output control unit 104 inquires about the type of terminal connected to the TV monitor 3 from the output setting unit 103. If terminal connected to the TV monitor 3 is the component output terminal 66, the output control unit 104 inquires about the currently set output format of a video signal output from the component output terminal 66. If the terminal connected to the TV monitor 3 is the component output terminal 66 and the output format is 1125i or 750p, the output control unit 104 stores the current output format in a memory 105. The output control unit 104 then reads, from a storage unit 106, the output format predefined by a user (hereinafter referred to as an "alternative" format) when the detection signal is delivered. The output control unit 104 converts the format to the readout alternative output format. That is, the output control unit 104 delivers an output format setting signal of the alternative output format stored in the storage unit 106 to the output setting unit 103. A method for setting an alternative output format is described later with reference to FIG. 9.

As stated above, the memory 105 stores the output format delivered from the output control unit 104. The storage unit 106 stores an alternative output format set by a user.

When the delivery of the detection signal from the signal processing unit 102 stops, that is, when the signal processing unit 102 does not detect CSS or Macrovision signal, the output control unit 104 delivers an output format setting signal indicating the original output format temporarily stored in the memory 105 to the output setting unit 103, and therefore, the setting of the format returns to the original format (i.e., the output setting unit 103 is switched to the original output format).

In FIG. 4, the signal input unit 101 corresponds to the input unit 30 or the DVD drive 34 shown in FIG. 3, and the output control unit 104 corresponds to the CPU 21 (the video output program executed by the CPU 21) shown in FIG. 3. Additionally, the memory 105 and the storage unit 106 correspond to the RAM 23 and the HDD 32, respectively.

The initial setting process of an output format from the component output terminal 66 carried out by a user is described next with reference to FIGS. 5 through 7 when the TV monitor 3 is connected to the component output terminal 66 of the video output unit 52 for the first time.

Figure 5:
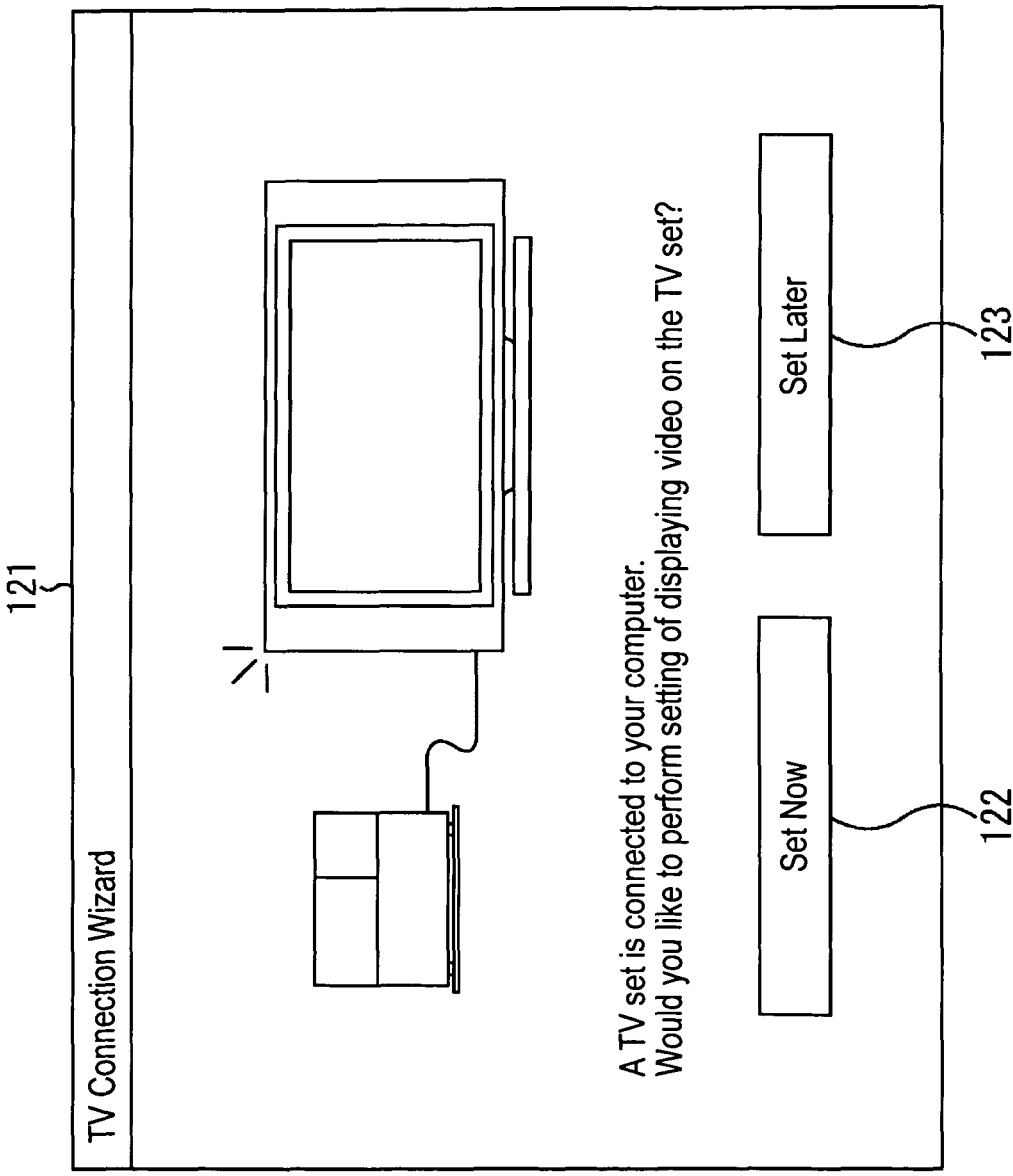
FIG. 5 illustrates a screen format of an initial setting of an output format.

When the TV monitor 3 is connected to the component output terminal 66 of the video output unit 52 via a predetermined signal cable for the first time, the computer 1 displays a TV-output setting check window 121 shown in FIG. 5 on the VGA monitor 2.

In the TV-output setting check window 121, a message "A TV set is connected to your computer. Would you like to perform setting of video display on the TV set?" is displayed together with a "Set Now" button 122 and a "Set Later" button 123.

When a user sets the output format when the video is output from the component output terminal 66 at that time, the user clicks the "Set Now" button 122 by using a mouse or a keyboard. When the user sets the output format later, the user clicks the "Set Later" button 123 by using the mouse or the keyboard.

Figure 6:
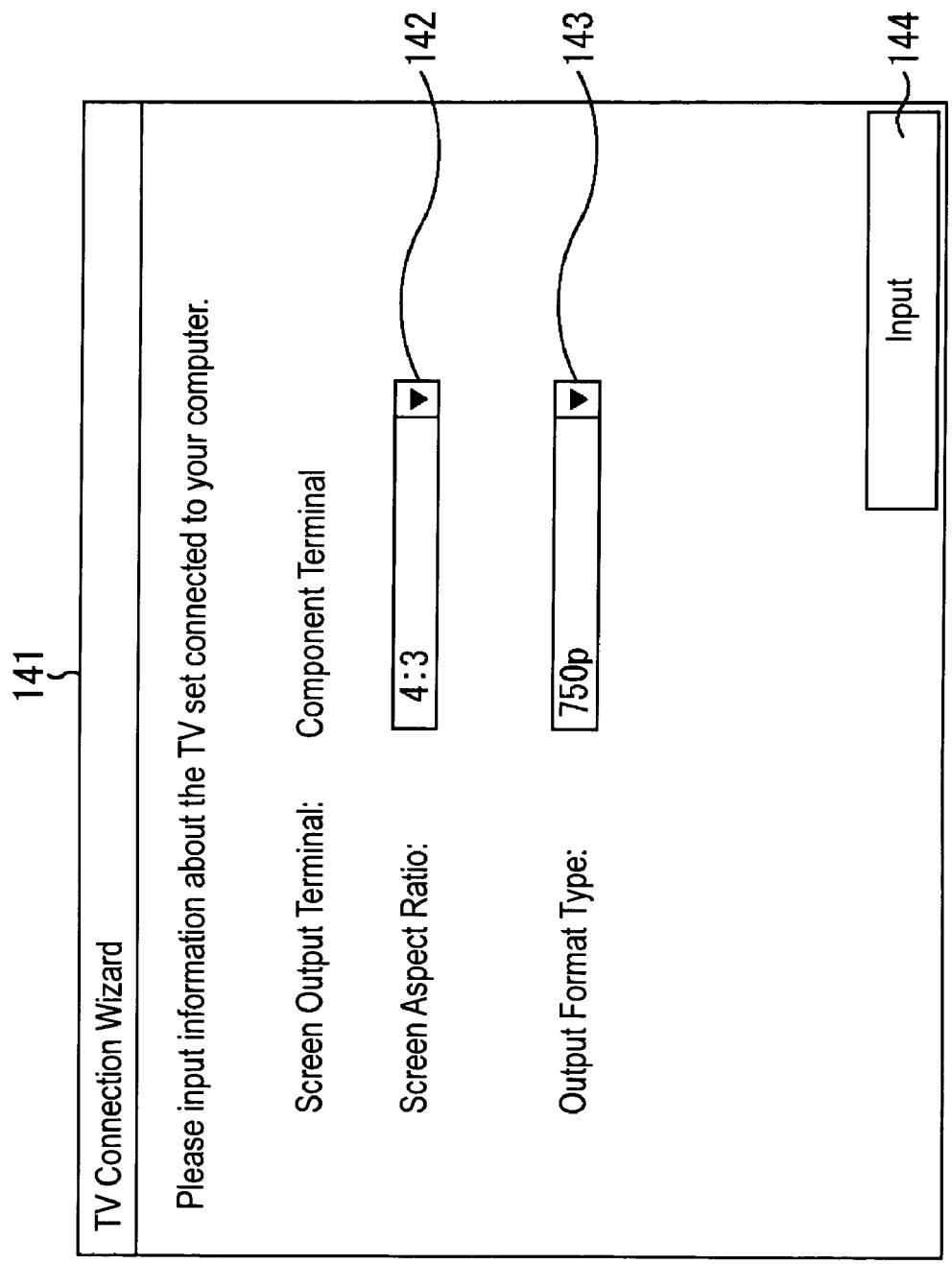
FIG. 6 illustrates another screen format of an initial setting of an output format.

In the TV-output setting check window 121 shown in FIG. 5, when the "Set Now" button 122 is clicked by the user, a TV information input window 141 shown in FIG. 6 is displayed on the VGA monitor 2.

In contrast, in the TV-output setting check window 121 shown in FIG. 5, when the "Set Later" button 123 is clicked by the user, the TV-output setting check window 121 on the VGA monitor 2 disappears and the initial setting process of an output format from the component output terminal 66 carried out by the user is completed. In this case, the TV monitor 3 is not used. When the computer 1 is started next time while the TV monitor 3 is connected to either one of the S-video output terminal 64, the composite output terminal 65, and the component output terminal 66, the TV-output setting check window 121 shown in FIG. 5 is displayed on the VGA monitor 2 again.

In the TV-output setting check window 121 shown in FIG. 5, when the "Set now" button 122 is clicked by the user, a TV information input window 141 shown in FIG. 6 displays a message "Please input information about the TV set connected to your computer." and three setting items "Screen Output Terminal", "Screen Aspect Ratio", and "Output Format Type".

On the right of the item "Screen Output Terminal", the type of output terminal connected to the TV monitor 3 and detected by the output setting unit 103 is displayed. In this example, since the TV monitor 3 is connected to the component output terminal 66, a character string "Component terminal" is displayed on the right of the item "Screen Output Terminal".

On the right of the item "Screen Aspect Ratio", a combo box 142 is displayed to allow selection of an aspect ratio of a video signal output from the component output terminal 66. As shown in FIG. 7, in the combo box 142, one of two types of aspect ratio "4:3" and "16:9" can be selected.

On the right of the item "Output Format Type", a combo box 143 is displayed to allow selection of a signal format (output format) of a video signal output from the component output terminal 66. As shown in FIG. 7, in the combo box 143, one of four output formats 525i, 525p, 1125i, and 750p can be selected.

A receiving device having a component video signal input terminal, such as the TV monitor 3, has its specification about which formats of 525i, 525p, 1125i, and 750p it can receive. The combo box 143 is used for the user to specify the "broadest" specification of the receiving device connected to the computer 1.

When the type of the output terminal detected by the output setting unit 103 is the S-video output terminal 64 or the composite output terminal 65, that is, when a character string "S terminal" or "Composite terminal" is displayed on the right of the item "Screen output terminal", the item "Output format type" does not appear in the window.

The user selects a predetermined item from among a plurality of selectable items in the combo boxes 142 and 143 and clicks an "Input" button 144. Thus, the output control unit 104 delivers the output format setting signal indicating the output format selected by the user to the output setting unit 103. Upon receiving a video signal from the signal processing unit 102, the output setting unit 103 outputs the video signal of the output format indicated by the output format setting signal from the component output terminal 66.

Figure 7:
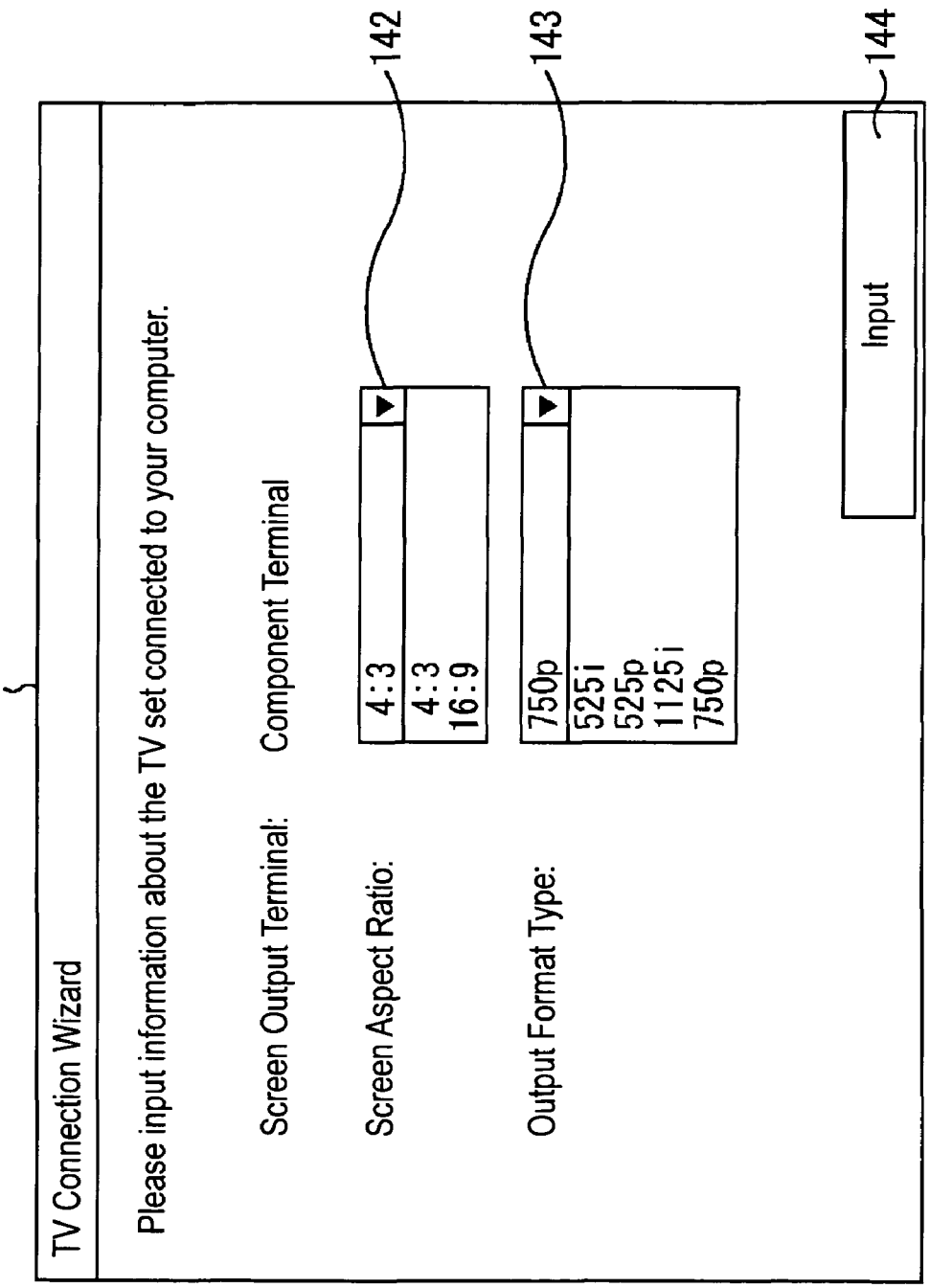
FIG. 7 illustrates another screen format of an initial setting of an output format.
Figure 8:
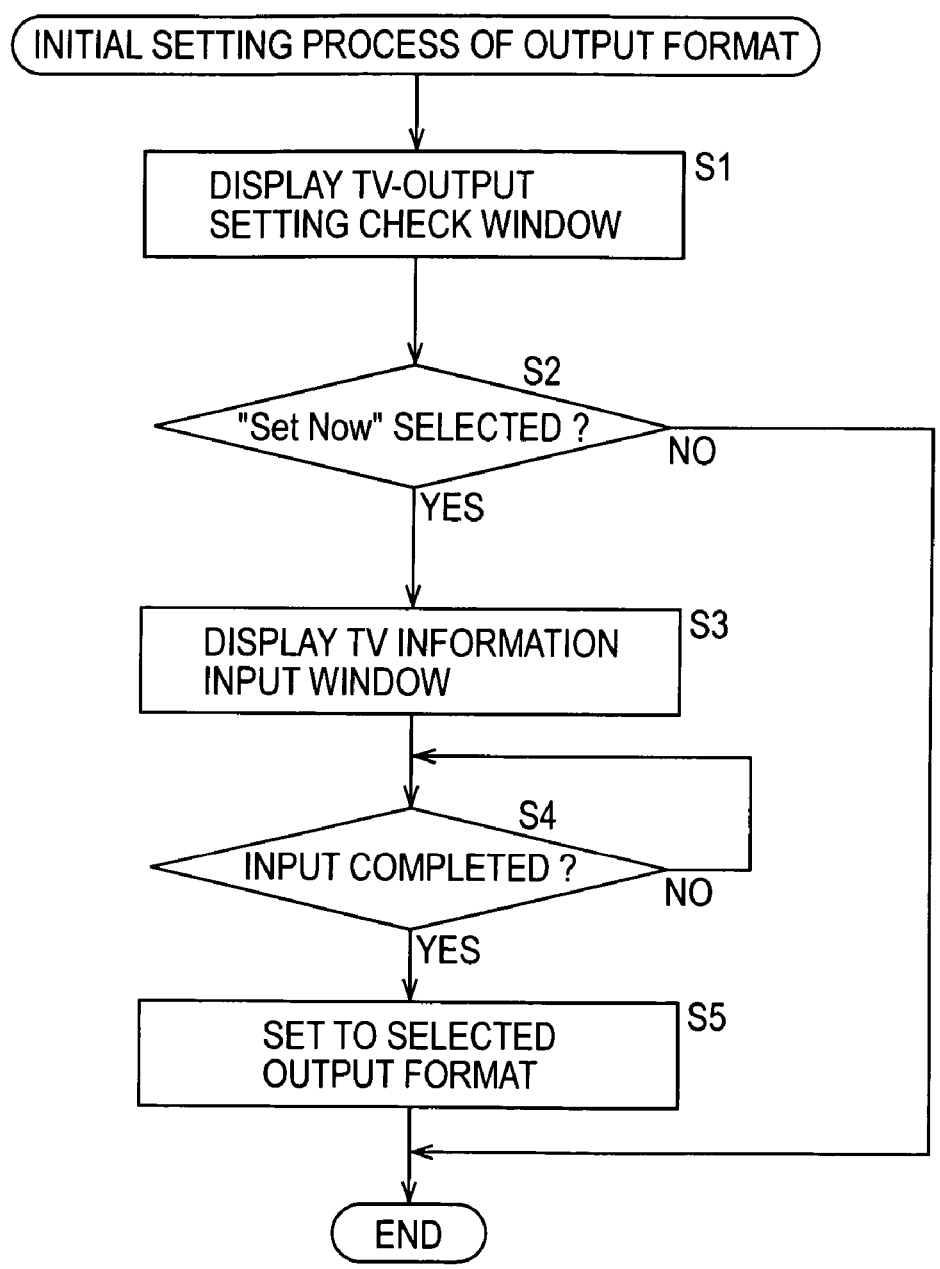
FIG. 8 is a flow chart illustrating an initial setting of an output format.

The initial setting process of an output format from the component output terminal 66 carried out by a user, which is described with reference to FIGS. 5 to 7, is described in more detail with reference to a flow chart in FIG. 8. This process starts when, for example, the TV monitor 3 is connected to the component output terminal 66 of the video output unit 52 for the first time.

At step S1, the computer 1 displays the TV-output setting check window 121 shown in FIG. 5 on the VGA monitor 2. The process then proceeds to step S2.

At step S2, the computer 1 determines whether a user selects the "Set Now" button 122 in the TV-output setting check window 121 shown in FIG. 5. If it is determined at step S2 that the user does not select the "Set Now" button 122, that is, if it is determined that the user selects the "Set Later" button 123, the process is completed.

In contrast, if it is determined at step S2 that the user selects the "Set Now" button 122, the process proceeds to step S3. At step S3, the computer 1 displays the TV information input window 141 shown in FIG. 6 on the VGA monitor 2. The process then proceeds to step S4.

At step S4, the computer 1 determines whether the input of the output format in the TV information input window 141 shown in FIG. 6 is completed. If it is determined that the input of the output format is not completed, the process waits until it is completed.

If it is determined at step S4 that the input of the output format has been completed, that is, if it is determined that the "Input" button 144 has been clicked by the user, the process proceeds to step S5. At step S5, the computer 1 stores, in the storage unit 106, the output format selected by the user via the TV information input window 141 shown in FIG. 6. Additionally, at step S5, the computer 1 sets the output format selected by the user to the output setting unit 103. The process is then completed. That is, the output control unit 104 of the computer 1 delivers the output format setting signal indicating the output format selected by the user in the TV information input window 141 shown in FIG. 6 to the output setting unit 103. Thus, the output setting unit 103 sets an output format of a video signal output from the component output terminal 66 to be the output format indicated by the output format setting signal. The process is then completed.

As described above, the signal format (the broadest format) that the TV monitor 3 connected to the component output terminal 66 can receive, namely, the signal format (the broadest format) that the computer 1 can output from the component output terminal 66 is set to the computer 1.

Subsequently, upon receiving the detection signal from the signal processing unit 102, the output control unit 104 of the computer 1 temporarily stores the output format set in the output format initial setting process shown in FIG. 8 in the memory 105 and reads out the alternative output format predefined by the user from the storage unit 106. The output control unit 104 changes the setting to the readout alternative output format.

Figure 9:
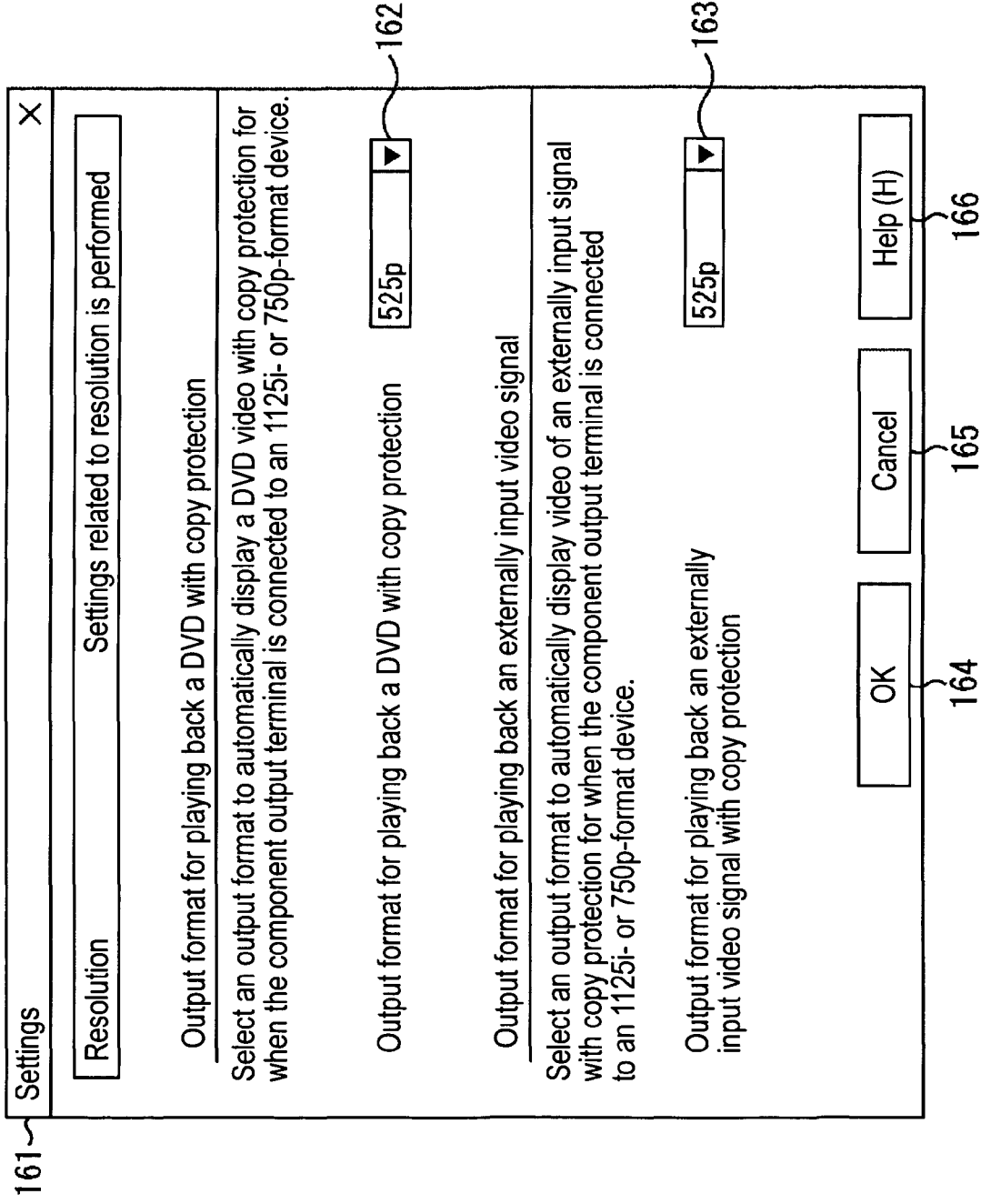
FIG. 9 illustrates a screen format for setting an alternative output format.

FIG. 9 illustrates an example of a setting window used to set the alternative output format stored in the storage unit 106.

In a setting window 161 shown in FIG. 9, the user selects, from a combo box 162, an output format to be selected when CSS encryption is detected in a video signal played back by the DVD drive 34.

That is, under the item "Output format for playing back a DVD with copy protection", the combo box 162 is provided along with the description "Select an output format to display a DVD video with copy protection for when the component output terminal is connected to an 1125i- or 750p-format device.".

From a combo box 163, the user selects an output format to be selected when the Macrovision signal is detected in a video signal (externally) input from the input unit 30.

That is, under the item "Output format for playing back an externally input video signal", the combo box 163 is provided along with the description "Select an output format to display video of an externally input signal with copy protection for when the component output terminal is connected to an 1125i- or 750p-format device.".

When the component output terminal 66 can output a video signal of the 525p, 1025i, or 750p format, one of the 525i format and 525p can be selected from the combo boxes 162 and 163. The 525p format is the default format. When the component output terminal 66 outputs a video signal of the 525i format, the combo boxes 162 and 163 are grayed out with "525i" being selected. Therefore, the user cannot change the selection.

After the user selects the desired output formats from the combo boxes 162 and 163, the user clicks on an "OK" button 164. Thus, the output control unit 104 stores the output formats set in the combo boxes 162 and 163 in the storage unit 106 as the alternative output formats.

If the user wants to cancel the setting in the combo boxes 162 and 163, that is, if the user wants to terminate the setting operation without changing the current setting, the user clicks on a "Cancel" button 165. In this case, the output formats set (changed) in the combo boxes 162 and 163 are not stored in the storage unit 106. When the user wants to display a help screen about the operation of the setting window 161, the user clicks on a "Help" button 166.

The alternative output formats set as described above are read out of the storage unit 106 when the output control unit 104 receives the detection signal from the signal processing unit 102 and are set in the output setting unit 103.

The output control process is described below with reference to a flow chart shown in FIG. 10 when the DVD drive 34 starts to play back the DVD 71.

At step S21, the output control unit 104 determines whether CSS encryption is detected or not. The output control unit 104 waits until it is determined that CSS encryption is detected. That is, the output control unit 104 waits until it receives a detection signal from the signal processing unit 102.

If it is determined at step S21 that CSS encryption is detected, the process proceeds to step S22. At step S22, the output control unit 104 inquires about the type of terminal currently connected to the TV monitor 3 and the output format of the component output terminal 66 from the output setting unit 103. The output setting unit 103 detects the output format which is set by the user via the TV information input window 141 shown in FIG. 6 and which is the currently set output format of a video signal output from the component output terminal 66. The output setting unit 103 then delivers the output format to the output control unit 104. Thereafter, the process proceeds to step S23.

At step S23, the output control unit 104 determines whether the current output format delivered from the output setting unit 103 is either one of 1125i or 750p. If it is determined at step S23 that the current output format delivered from the output setting unit 103 is either one of 1125i or 750p, the process proceeds to step S24. At step S24, the output control unit 104 stores the current output format in the memory 105. The process then proceeds to step S25.

At step S25, the output control unit 104 reads out the alternative output format preset by the user via the setting window 161 shown in FIG. 9 from the storage unit 106 and changes the setting to the readout alternative output format, namely, the format selected via the combo box 162. The process then proceeds to step S26.

In contrast, if it is determined at step S23 that the current output format delivered from the output setting unit 103 is neither 1125i nor 750p, that is, if it is determined that the current output format is either one of 525i or 525p, the process proceeds to step S26.

At step S26, the output setting unit 103 starts to output a video signal delivered from the signal processing unit 102 to the TV monitor 3 in the currently set output format (525i or 525p). The process is then completed.

The output control process is described below with reference to a flow chart shown in FIG. 11 when the DVD drive 34 stops playing back the DVD 71.

At step S41, the output control unit 104 determines whether the DVD drive 34 stops playing back the DVD 71. If not, the process waits until it is determined that the DVD drive 34 stops playing back the DVD 71.

If it is determined at step S41 that the DVD drive 34 stops playing back the DVD 71, that is, if it is determined that the signal processing unit 102 stops supplying a playback processing signal, the process proceeds to step S42. At step S42, the output control unit 104 determines whether it changed the output format when it started the playback. If it is determined at step S42 that the output control unit 104 did not change the output format, the process is completed.

However, if it is determined at step S42 that the output format was changed, the process proceeds to step S43. At step S43, the output control unit 104 changes the setting to the original output format stored in the memory 105. The process is then completed.

The output control process of a video signal externally input from the input unit 30 is described below with reference to a flow chart shown in FIG. 12.

At step S61, the output control unit 104 determines whether the Macrovision signal is detected or not. The process waits until it is determined that the Macrovision signal is detected. That is, the output control unit 104 waits until it receives a detection signal from the signal processing unit 102. If it is determined at step S61 that the Macrovision signal is detected, the process proceeds to step S62.

Figure 10:
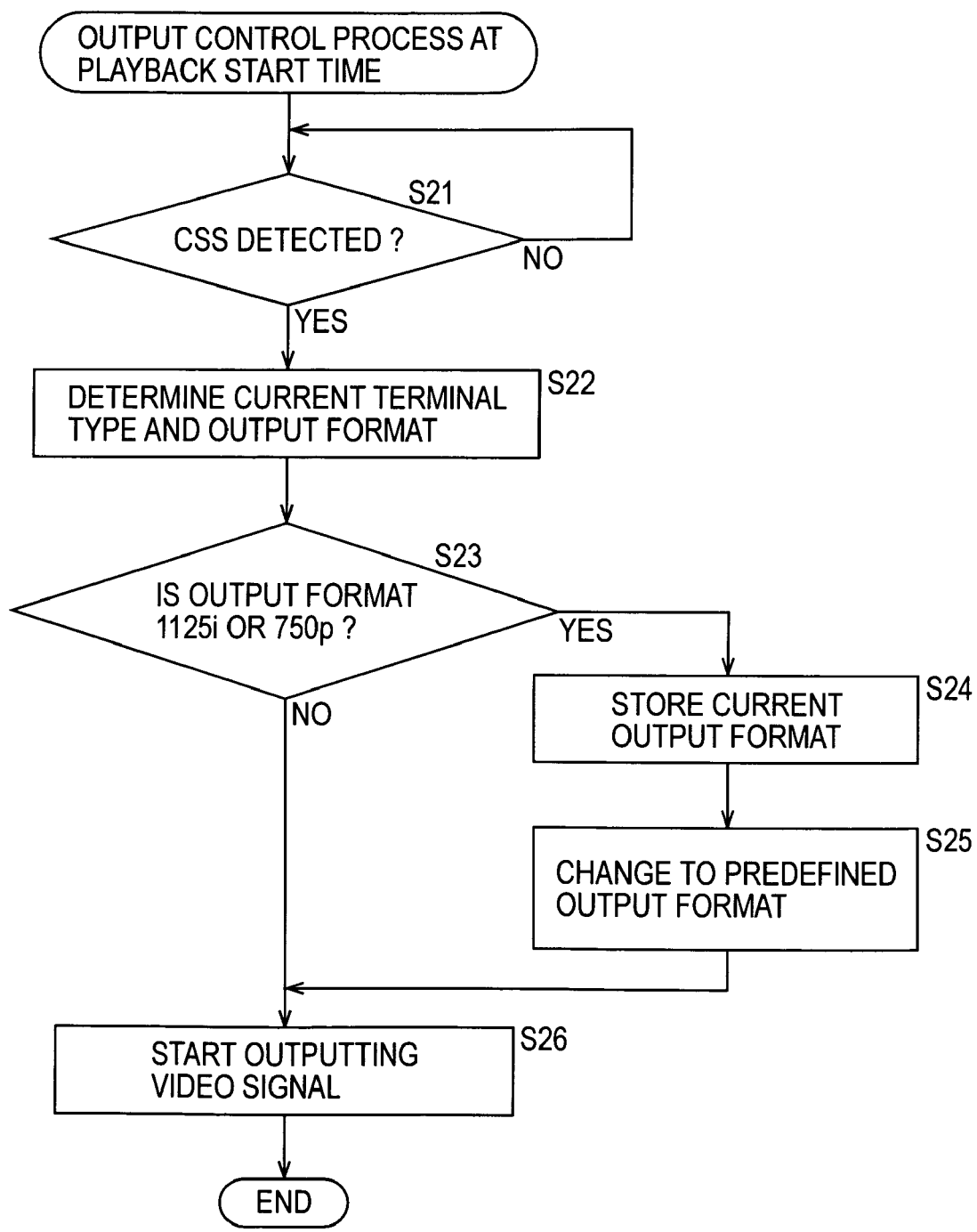
FIG. 10 is a flow chart illustrating an output control process.

The processes from steps S62 through S66 are identical to those from steps S22 through S26 shown in FIG. 10 except that the setting changed at step S65 (i.e., the alternative output format) becomes the format selected via the combo box 163 in place of the format selected via the combo box 162. Therefore, the description is not repeated.

Figure 11:
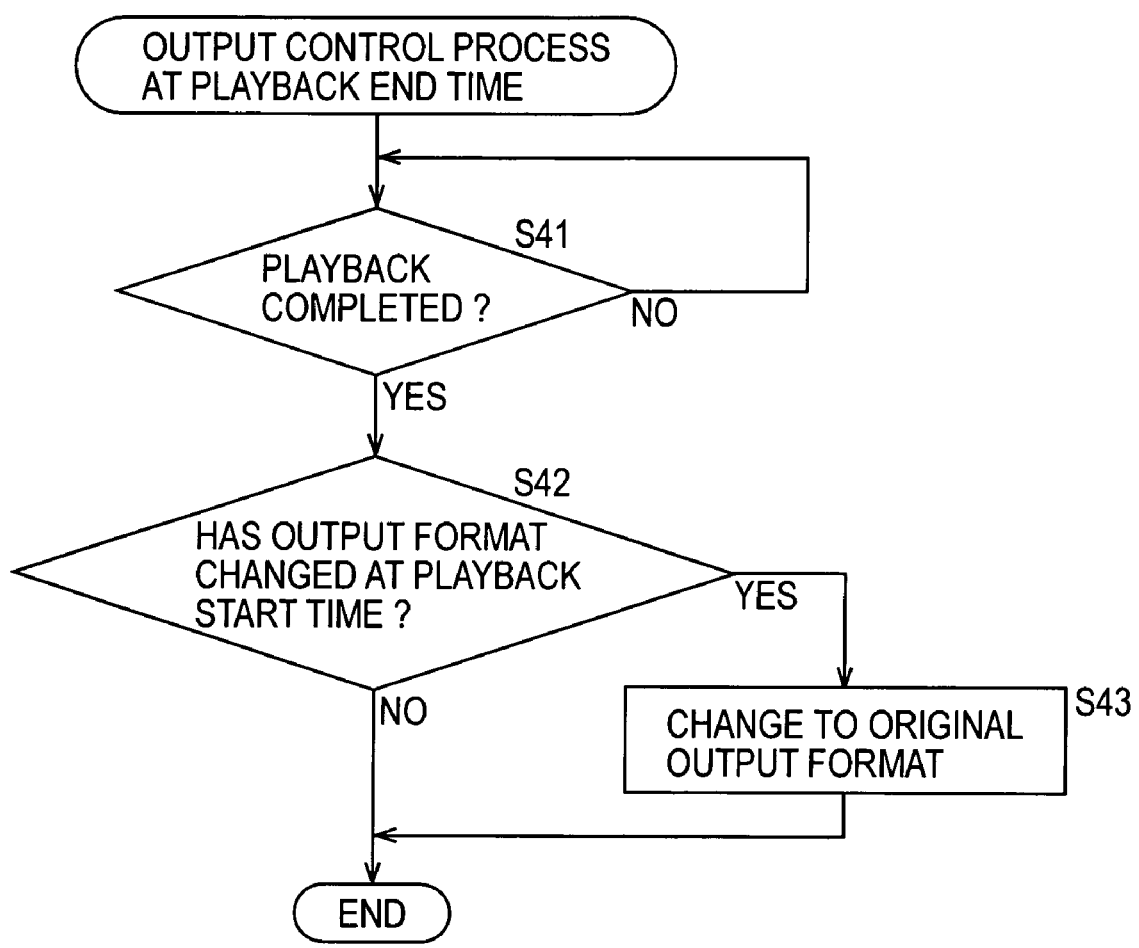
FIG. 11 is a flow chart illustrating another output control process.

In addition, the output control process when the input of a video signal from the input unit 30 ends is identical to that shown in FIG. 11. Therefore, the description is not repeated.

As described above, according to the output control process shown in FIGS. 10 and 12, when the computer 1 including the component output terminal 66 capable of outputting a signal of the 525i, 525p, 1125i, or 750p format needs to output a video signal of the 525i or 525p format, that is, when the video signal output from the component output terminal 66 is encrypted with CSS or contains the Macrovision signal, the computer 1 can change the output format to the predefined alternative output format (525i or 525p) stored in the storage unit 106 and can output the video signal from the component output terminal 66.

Additionally, according to the output control process shown in FIG. 11, when the output of a video signal of the 525i or 525p format from the component output terminal 66 is completed, the set format is changed to the (broadest) output format (1125i or 750p) that the TV monitor 3 can receive. Consequently, when the video signal of a format other than the 525i or 525p format is output from the component output terminal 66, the video signal can be output while maintaining the high-definition output format.

Thus, for example, a TV program received by a high-definition receiver or video captured by an HD digital camera can be output from the component output terminal 66 in the high-definition output format (1125i or 750p). In contrast, movie video which is played back by the DVD drive 34 and in which the Macrovision signal is embedded can be output from the component output terminal 66 in the 525i or 525p format. That is, the output format can be changed depending on the type of video signal output from the component output terminal 66.

While the above-described exemplary embodiment of the present invention has been described with reference to a video signal encrypted with CSS or a video signal in which the Macrovision signal is embedded as a video signal output in the 525i or 525p format, the video signal is not intended to be limited to such video signals. The video signal may be of another type.

Additionally, the video signal encrypted with CSS or a video signal interposed with the Macrovision signal may be a signal received by the tuner 26 in addition to the above-described signal played back by the DVD drive 34 or a signal input from the input unit 30.

Furthermore, while the above-described exemplary embodiment of the present invention has been described with reference to the computer 1 that can detect both CSS and Macrovision signals, the computer is not intended to be limited to such a computer. The computer 1 may detect either one of CSS and Macrovision signals.

While, in the embodiment of the invention disclosed herein, the TV monitor 3 includes the screen 12 larger than the screen 11 of the VGA monitor 2 for simplicity, the screen 12 of the TV monitor 3 is not intended to be limited to such a size. The screen 12 of the TV monitor 3 is not necessarily larger than the screen 11 of the VGA monitor 2.

Still furthermore, while the above-described exemplary embodiment of the present invention has been described with reference to a device including a component output terminal as a computer, the device is not intended to be limited to such a computer. The present invention can be applied to a recording and playback apparatus including an HDD or a DVD in addition to a computer.

In the present specification, the steps described with reference to the above-described flow charts are not necessarily executed in the above-described sequence, but may be executed in parallel or independently.

In addition, as used in the present specification, the term "system" refers to a combination of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for outputting a predetermined video signal from a component output terminal, comprising:
    an input unit configured to receive a digital output format selected by a user and save the digital output format selected by the user as an alternative digital output format;
    a signal detection unit configured to detect whether the video signal of a predetermined digital format is encrypted using CSS encryption;
    a setting detection unit configured to detect a currently set digital output format of the video signal output from the component output terminal when the video signal is encrypted; and
    a changing unit configured to change the digital output format of the video signal detected by the setting detection unit from the predetermined digital format to the alternative digital output format when the digital output format detected by the setting detection unit is the predetermined digital format, the predetermined digital format is different than the alternative digital format, and the video signal is encrypted using CSS encryption.

2. The information processing apparatus according to claim 1, wherein if the signal detection unit detects that the video signal is not encrypted, the signal detection unit is configured to detect a copy protection signal embedded in the video signal, the copy protection signal protecting copyright, and the changing unit is configured to change the digital output format detected by the setting detection unit to the alternative digital output format if the copy protection signal is detected.

3. The information processing apparatus according to claim 1, wherein the changing unit is configured to change from the digital output format having a first resolution to the alternative digital output format having a second resolution different than the first resolution.

4. The information processing apparatus according to claim 1, wherein the changing unit is configured to change from the digital output format having a first resolution to the alternative digital output format having a second resolution less than the first resolution.

5. The information processing apparatus according to claim 1, wherein the changing unit is configured to change from the digital output format having a resolution of 1125i or 750p to the alternative digital output format having a resolution of 525i or 525p.

6. The information processing apparatus according to claim 1, wherein the input unit is configured to receive the alternative digital output format having a resolution of one of 525i or 525p.

7. The information processing apparatus according to claim 1, wherein the input unit is configured to receive both a user selected digital output format for playing back a DVD with copyright protection and a user selected digital output format for playing back an externally input video signal with copy protection.

* * * * *